US012732961B2

(12) United States Patent
Zhang

(10) Patent No.: US 12,732,961 B2
(45) Date of Patent: Sep. 8, 2026

(54) METHOD AND DEVICE IN NODES USED FOR WIRELESS COMMUNICATION

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 351 days.

(21) Appl. No.: 17/548,572

(22) Filed: Dec. 12, 2021

(65) Prior Publication Data

US 2022/0201653 A1 Jun. 23, 2022

(30) Foreign Application Priority Data

Dec. 22, 2020 (CN) .......................... 202011533111.0

(51) Int. Cl.
*H04W 72/02* (2009.01)
*H04W 24/08* (2009.01)
(Continued)

(52) U.S. Cl.
CPC ........... *H04W 72/02* (2013.01); *H04W 24/08* (2013.01); *H04W 72/0446* (2013.01); *H04W 72/0453* (2013.01)

(58) Field of Classification Search
CPC ............. H04W 72/02; H04W 72/0446; H04W 72/0453; H04W 24/08
See application file for complete search history.

(56) References Cited

U.S. PATENT DOCUMENTS 11,304,231 B2 * 4/2022 Jiang ..................... H04L 5/0094
2019/0380136 A1 * 12/2019 Zhang ....................... H04L 1/08
(Continued)

FOREIGN PATENT DOCUMENTS

CN 107769825 A 3/2018
CN 111988850 A 11/2020
CN 112040543 A 12/2020

OTHER PUBLICATIONS

First Office Action of Chinese patent application No. CN202011533111.0 dated Feb. 5, 2024.

(Continued)

*Primary Examiner* — Yemane Mesfin
*Assistant Examiner* — Jia Hao Deng
(74) *Attorney, Agent, or Firm* — Volpe Koenig

(57) ABSTRACT

The present disclosure provides a method and a device in a node used for wireless communications. A first receiver, monitoring in a first time-frequency resource pool and a second time-frequency resource pool; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool is associated with the second time-frequency resource pool; when time-domain resources occupied by the second time-frequency resource pool and the first time window are orthogonal, the first time-frequency resource pool is not associated with the second time-frequency resource pool.

18 Claims, 4 Drawing Sheets

(51) Int. Cl.
*H04W 72/0446* (2023.01)
*H04W 72/0453* (2023.01)

(56) References Cited

U.S. PATENT DOCUMENTS

| | | | | |
|---|---|---|---|---|
| 2020/0153581 A1* | 5/2020 | Tsai | ........................ | H04B 7/024 |
| 2023/0284235 A1* | 9/2023 | Gao | ...................... | H04W 72/23 |
| | | | | 370/329 |

OTHER PUBLICATIONS

First Search Report of Chinese patent application No. CN202011533111.0 dated Feb. 4, 2024.
AT&T "Resource allocation mechanism" 3GPP TSG RAN WG1 Meeting #95 R1-1812872 Nov. 16, 2018.
Third Generation Partnership Project, "Technical Specification Group Radio Access Network; NR; Physical channels and modulation (Release 16)," 3GPP TS 38.211 V16.3.0 (Sep. 2020).
Third Generation Partnership Project, "Technical Specification Group Radio Access Network; NR; Multiplexing and channel coding (Release 16)," 3GPP TS 38.212 V16.3.0 (Sep. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Physical layer procedures for data (Release 16)," 3GPP TS 38.214 V16.3.0 (Sep. 2020).
Third Generation Partnership Project, "Technical Specification Group Radio Access Network; NR; Radio Resource Control (RRC) protocol specification (Release 16)," 3GPP TS 38.331 V16.2.0 (Sep. 2020).

* cited by examiner

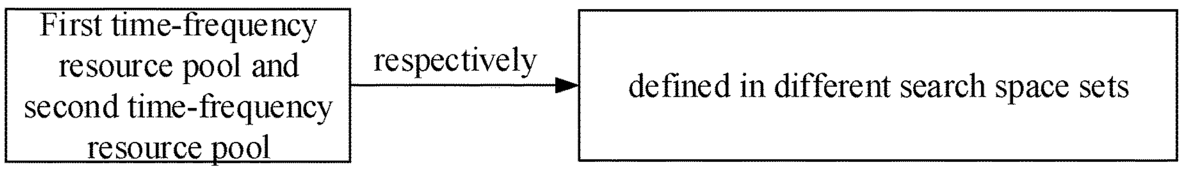
FIG. 7
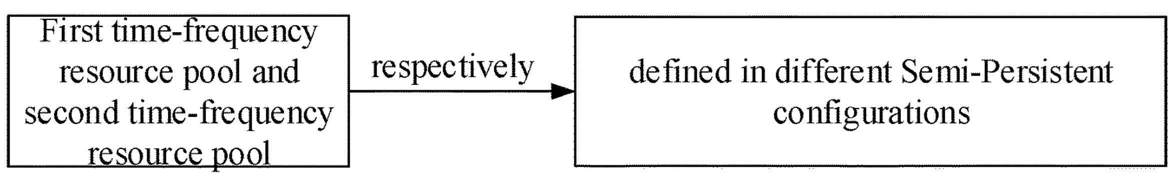
FIG. 8
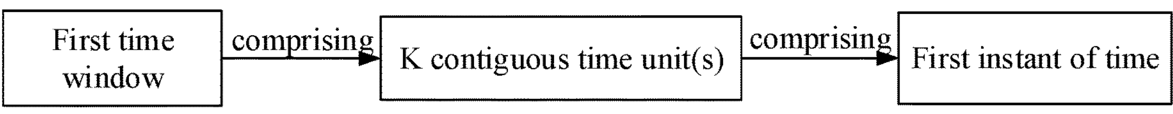
FIG. 9
FIG. 10
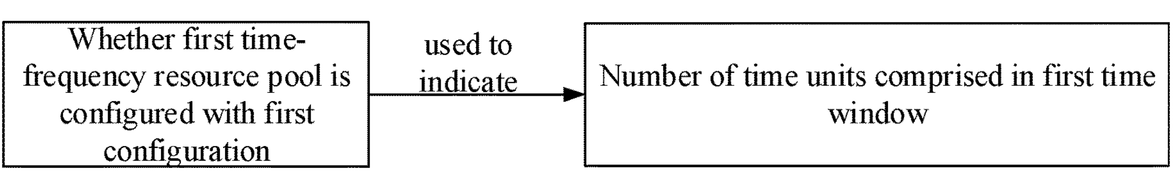
FIG. 11

METHOD AND DEVICE IN NODES USED FOR WIRELESS COMMUNICATION

CROSS REFERENCE TO RELATED APPLICATIONS

This application claims the priority benefit of Chinese Patent Application No. 202011533111.0, filed on Dec. 22, 2020, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

The Multi-antenna (e.g., Multiple Input Multiple Output, abbreviated as MIMO), Multi-Transmission Reception Point (Multi-TRP) and Multi-Panel techniques are important integral parts of NR. To better adapt to more diverse application scenarios and fulfill more demanding requirements, a WI of further enhancement of MIMO under NR was approved by the 3GPP RAN #86 Plenary to support multi-antenna communications with higher robustness and spectrum efficiency and more application scenarios.

SUMMARY

In multi-TRP communications, multiple TRPs can be used for serving a same User Equipment (UE) to enhance the robustness of communications or the transmission rate. The 3GPP supported multi-TRP transmissions of a data channel in Release 16 and approved a scheme of enhancement of Physical Downlink Control CHannel (PDCCH) transmission in multi-TRP communications through multiple repetitions. How to achieve multiple repetitions of PDCCH transmissions within an acceptable range of delay is a key issue to be addressed.

To address the above problem, the present disclosure provides a solution. It should be noted that though the present disclosure only took the Downlink (DL) for example in the statement above, it is also applicable to other transmission scenarios like Uplink (UL) and Sidelink (SL), where similar technical effects can be achieved. Additionally, the adoption of a unified solution for various scenarios, including but not limited to UL, DL and SL transmissions, contributes to the reduction of hardcore complexity and costs. It should be noted that if no conflict is incurred, embodiments in a UE in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

monitoring in a first time-frequency resource pool and a second time-frequency resource pool;

herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one embodiment, a problem to be solved in the present disclosure includes how to realize multiple repetitions of transmission of a physical channel (for instance, a PDCCH) as long as the delay is acceptable.

In one embodiment, characteristics of the above method include that only when restrictions of delay determined by the first time window are fulfilled will the first time-frequency resource pool and the second time-frequency resource pool are associated.

In one embodiment, characteristics of the above method include that only when restrictions of delay determined by the first time window are fulfilled will the first node deem that a PDCCH candidate comprised in the first time-frequency resource pool and a PDCCH candidate comprised in the second time-frequency resource pool are two PDCCH candidates being associated.

In one embodiment, characteristics of the above method include that only when restrictions of delay determined by the first time window are fulfilled will the first node assume that a signal transmitted in the first time-frequency resource pool and a signal transmitted in the second time-frequency resource pool can be jointly demodulated or decoded.

In one embodiment, an advantage of the above method lies in the avoidance of possible excessive delay caused by repetitions due to inconsistency in periodic configurations of search space sets and other factors.

In one embodiment, an advantage of the above method lies in improving the flexibility of scheduling, which contributes to the enhancement of the overall efficiency of the system.

In one embodiment, an advantage of the above method lies in taking into account both the reliability and delay performance.

In one embodiment, an advantage of the above method lies in strengthening the edge of multi-TRP communications in reliability.

In one embodiment, an advantage of the above method lies in benefiting the application of multi-TRP technique in Ultra Reliable and Low Latency Communication (URLLC) and traffics with lower latency requirements.

According to one aspect of the present disclosure, the above method is characterized in that:

a meaning of the first time-frequency resource pool being associated with the second time-frequency resource pool comprises: a PDCCH candidate comprised in the first time-frequency resource pool and a PDCCH candidate comprised in the second time-frequency resource pool are associated.

According to one aspect of the present disclosure, the above method is characterized in that:

a meaning of the first time-frequency resource pool being associated with the second time-frequency resource pool comprises: the first time-frequency resource pool and the second time-frequency resource pool collectively comprise a first-type PDCCH candidate, the first-type PDCCH candidate being a PDCCH candidate reserved for one repetition of a possible information bit block in the first time-frequency resource pool and another repetition of the information bit block in the second time-frequency resource pool.

According to one aspect of the present disclosure, the above method is characterized in that:

the first time-frequency resource pool and the second time-frequency resource pool are respectively defined in different search space sets.

According to one aspect of the present disclosure, the above method is characterized in that:

the first time-frequency resource pool and the second time-frequency resource pool are respectively defined in different semi-persistent configurations.

According to one aspect of the present disclosure, the above method is characterized in that:

the first time window comprises K contiguous time unit(s), the K contiguous time unit(s) comprising the first instant of time, K being a positive integer.

According to one aspect of the present disclosure, the above method is characterized in that:

whether the first time-frequency resource pool is configured with a first configuration is used to indicate a number of time units comprised in the first time window.

In one embodiment, an advantage of the above method lies in facilitating the implementation of traffic diversity (such as configuring different time windows for traffics with various requests for Quality of Service (QoS)).

The present disclosure provides a method in a second node for wireless communications, comprising:

transmitting in at least one of a first time-frequency resource pool or a second time-frequency resource pool;

herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

According to one aspect of the present disclosure, the above method is characterized in that:

a meaning of the first time-frequency resource pool and the second time-frequency resource pool being associated comprises: a PDCCH candidate comprised in the first time-frequency resource pool and a PDCCH candidate comprised in the second time-frequency resource pool are associated.

According to one aspect of the present disclosure, the above method is characterized in that:

A meaning of the first time-frequency resource pool and the second time-frequency resource pool being associated comprises: the first time-frequency resource pool and the second time-frequency resource pool collectively comprise a first-type PDCCH candidate, the first-type PDCCH candidate being a PDCCH candidate reserved for one repetition of a possible information bit block in the first time-frequency resource pool and another repetition of the information bit block in the second time-frequency resource pool.

According to one aspect of the present disclosure, the above method is characterized in that:

the first time-frequency resource pool and the second time-frequency resource pool are respectively defined in different search space sets.

According to one aspect of the present disclosure, the above method is characterized in that:

the first time-frequency resource pool and the second time-frequency resource pool are respectively defined in different semi-persistent configurations.

According to one aspect of the present disclosure, the above method is characterized in that:

the first time window comprises K contiguous time unit(s), the K contiguous time unit(s) comprising the first instant of time, K being a positive integer.

According to one aspect of the present disclosure, the above method is characterized in that:

whether the first time-frequency resource pool is configured with a first configuration is used to indicate a number of time units comprised in the first time window.

The present disclosure provides a first node for wireless communications, comprising:

a first receiver, monitoring in a first time-frequency resource pool and a second time-frequency resource pool;

herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

The present disclosure provides a second node for wireless communications, comprising:

a second transmitter, transmitting in at least one of a first time-frequency resource pool or a second time-frequency resource pool;

herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one embodiment, the method in the present disclosure has the following advantages:

- avoiding potentially excessive latency resulting from repeated transmissions (due to the inconsistent periodic configurations of search space sets or other factors);
- increasing the flexibility of scheduling;
- facilitating the improvement of the entire system's performance;
- considering the reliability and delay performance simultaneously;
- facilitating a full play of the advantage in reliability of the multi-TRP communications;
- facilitating the realization of traffic diversity;
- facilitating the combination of multi-TRP technique and other techniques.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates an explanatory diagram of the meaning of a first time-frequency resource pool and a second time-frequency resource pool being associated according to one embodiment of the present disclosure.

FIG. 8 illustrates a schematic diagram of determining a first time-frequency resource pool and a second time-frequency resource pool according to one embodiment of the present disclosure.

FIG. 9 illustrates a schematic diagram of determining a first time-frequency resource pool and a second time-frequency resource pool according to one embodiment of the present disclosure.

FIG. 10 illustrates a schematic diagram of relations between a first time window, K contiguous time unit(s) and a first instant of time according to one embodiment of the present disclosure.

FIG. 11 illustrates a schematic diagram of a number of time units comprised in a first time window according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
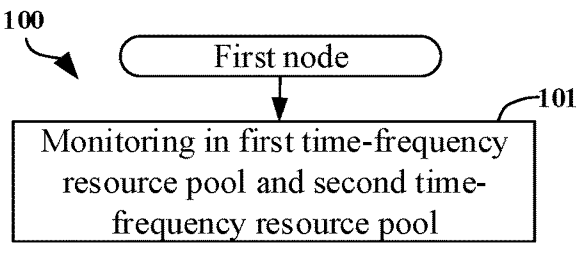
FIG. 1 illustrates a flowchart of processing of a first node according to one embodiment of the present disclosure.

Embodiment 1 illustrates a flowchart of processing of a first node, as shown in FIG. 1.

In Embodiment 1, the first node in the present disclosure performs monitoring in a first time-frequency resource pool and a second time-frequency resource pool in step 101.

In Embodiment 1, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one embodiment, the signal in the present disclosure comprises a radio signal.

In one embodiment, the signal in the present disclosure comprises a radio frequency signal.

In one embodiment, the signal in the present disclosure comprises a baseband signal.

In one embodiment, the first time-frequency resource pool comprises a positive integer number of subcarrier(s) in frequency domain.

In one embodiment, the first time-frequency resource pool comprises a positive integer number of Physical Resource Block(s) (PRB(s)) in frequency domain.

In one embodiment, the first time-frequency resource pool comprises a positive integer number of Resource block(s) (RB(s)) in frequency domain.

In one embodiment, the first time-frequency resource pool comprises a positive integer number of multicarrier symbol(s) in time domain.

In one embodiment, the first time-frequency resource pool comprises a positive integer number of slot(s) in time domain.

In one embodiment, the first time-frequency resource pool comprises a positive integer number of sub-slot(s) in time domain.

In one embodiment, the first time-frequency resource pool comprises a positive integer number of millisecond(s) (ms) in time domain.

In one embodiment, the first time-frequency resource pool comprises a positive integer number of contiguous multi-carrier symbols in time domain.

In one embodiment, the first time-frequency resource pool is configured by a physical layer signaling.

In one embodiment, the first time-frequency resource pool is configured by a higher layer signaling.

In one embodiment, the first time-frequency resource pool is configured by a Radio Resource Control (RRC) signaling.

In one embodiment, the first time-frequency resource pool is configured by a Medium Access Control layer Control Element (MAC CE) signaling.

In one embodiment, the first time-frequency resource pool is reserved for an uplink physical layer channel.

In one embodiment, the first time-frequency resource pool is reserved for a Physical Uplink Shared CHannel (PUSCH).

In one embodiment, the first time-frequency resource pool is reserved for a downlink physical layer channel.

In one embodiment, the first time-frequency resource pool is reserved for a Physical Downlink Shared CHannel (PDSCH).

In one embodiment, the first time-frequency resource pool is reserved for a PDCCH candidate.

In one embodiment, the second time-frequency resource pool comprises a positive integer number of subcarrier(s) in frequency domain.

In one embodiment, the second time-frequency resource pool comprises a positive integer number of PRB(s) in frequency domain.

In one embodiment, the second time-frequency resource pool comprises a positive integer number of RB(s) in frequency domain.

In one embodiment, the second time-frequency resource pool comprises a positive integer number of multicarrier symbol(s) in time domain.

In one embodiment, the second time-frequency resource pool comprises a positive integer number of slot(s) in time domain.

In one embodiment, the second time-frequency resource pool comprises a positive integer number of sub-slot(s) in time domain.

In one embodiment, the second time-frequency resource pool comprises a positive integer number of millisecond(s) (ms) in time domain.

In one embodiment, the second time-frequency resource pool comprises a positive integer number of contiguous multicarrier symbols in time domain.

In one embodiment, the second time-frequency resource pool is configured by a physical layer signaling.

In one embodiment, the second time-frequency resource pool is configured by a higher layer signaling.

In one embodiment, the second time-frequency resource pool is configured by an RRC signaling.

In one embodiment, the second time-frequency resource pool is configured by a MAC CE signaling.

In one embodiment, the second time-frequency resource pool is reserved for an uplink physical layer channel.

In one embodiment, the second time-frequency resource pool is reserved for a PUSCH.

In one embodiment, the second time-frequency resource pool is reserved for a downlink physical layer channel.

In one embodiment, the second time-frequency resource pool is reserved for a PDSCH.

In one embodiment, the second time-frequency resource pool is reserved for a PDCCH candidate.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the first time-frequency resource pool and the second time-frequency resource pool can correspond to different TRPs respectively.

In one embodiment, the phrase of monitoring in the first time-frequency resource pool and the second time-frequency resource pool means that listening of signals is performed both in the first time-frequency resource pool and the second time-frequency resource pool.

In one embodiment, the phrase of monitoring in the first time-frequency resource pool and the second time-frequency resource pool means that signal reception is performed both in the first time-frequency resource pool and the second time-frequency resource pool.

In one embodiment, the phrase of monitoring in the first time-frequency resource pool and the second time-frequency resource pool means that first-type channels are monitored respectively in the first time-frequency resource pool and the second time-frequency resource pool.

In one embodiment, the first time-frequency resource pool is reserved for the first-type channel.

In one embodiment, the second time-frequency resource pool is reserved for the first-type channel.

In one embodiment, the first-type channel comprises: a physical layer channel.

In one embodiment, the first-type channel comprises: a control channel.

In one embodiment, the first-type channel comprises: a PDCCH.

In one embodiment, the first-type channel comprises: a data channel.

In one embodiment, the first-type channel comprises: a PDSCH.

In one embodiment, the first-type channel comprises: a PUSCH.

In one embodiment, one said first-type channel comprises: a part of a PDCCH.

In one embodiment, one said first-type channel comprises: a part of a PDSCH.

In one embodiment, one said first-type channel comprises: a part of a PUSCH.

In one embodiment, the first time-frequency resource pool and the second time-frequency resource pool belong to a same serving cell.

In one embodiment, the first time-frequency resource pool and the second time-frequency resource pool respectively belong to different serving cells.

In one embodiment, the first time-frequency resource pool and the second time-frequency resource pool belong to a same Cell Group.

In one embodiment, the first time-frequency resource pool and the second time-frequency resource pool respectively belong to different cell groups.

In one embodiment, the boundary instant comprises: either a start time or an end time.

In one embodiment, the first instant of time implicitly indicates the first time window.

In one embodiment, the first time window comprises K time unit(s).

In one embodiment, the phrase of the first instant of time being used to indicate a first time window comprises: a start of the first time window is the first instant of time.

In one embodiment, the phrase of the first instant of time being used to indicate a first time window comprises: an end of the first time window is the first instant of time.

In one embodiment, the phrase of the first instant of time being used to indicate a first time window comprises: the first time window is K contiguous time units including the first instant of time; herein, the first instant of time is in a first time unit among the K contiguous time units.

In one embodiment, the phrase of the first instant of time being used to indicate a first time window comprises: the first time window is K contiguous time units including the first instant of time; herein, the first instant of time is in a last time unit among the K contiguous time units.

In one embodiment, the phrase of the first instant of time being used to indicate a first time window comprises: the first time window is K contiguous time units including the first instant of time; herein, the first instant of time is in a P-th time unit among the K contiguous time units, where P is a positive integer no greater than the K.

In one embodiment, when the first instant of time is a start time of a time unit: the first instant of time is in the time unit.

In one embodiment, when the first instant of time is an end time of a time unit: the first instant of time is in the time unit.

In one embodiment, the phrase that time-domain resources occupied by the second time-frequency resource pool and the first time window are overlapping means that: the first time window comprises all time-domain resources occupied by the second time-frequency resource pool; the phrase that time-domain resources occupied by the second time-frequency resource pool and the first time window are orthogonal means that: at least part of the time-domain resources occupied by the second time-frequency resource pool are not in the first time window.

In one embodiment, the phrase that time-domain resources occupied by the second time-frequency resource pool and the first time window are overlapping means that: the first time window comprises at least part of the time-domain resources occupied by the second time-frequency resource pool.

In one embodiment, the phrase that time-domain resources occupied by the second time-frequency resource pool and the first time window are orthogonal means that: the time-domain resources occupied by the second time-frequency resource pool and the first time window are non-overlapping.

In one embodiment, the phrase that time-domain resources occupied by the second time-frequency resource pool and the first time window are orthogonal means that: none of the time-domain resources occupied by the second time-frequency resource pool are in the first time window.

In one embodiment, the phrase that time-domain resources occupied by the second time-frequency resource pool and the first time window are overlapping means that: the first time window comprises a start time of the second time-frequency resource pool in time domain.

In one embodiment, the phrase that time-domain resources occupied by the second time-frequency resource pool and the first time window are orthogonal means that: a start time of the second time-frequency resource pool in time domain is not in the first time window.

In one embodiment, the phrase that time-domain resources occupied by the second time-frequency resource pool and the first time window are overlapping means that: the first time window comprises an end time of the second time-frequency resource pool in time domain.

In one embodiment, the phrase that time-domain resources occupied by the second time-frequency resource pool and the first time window are orthogonal means that: an end time of the second time-frequency resource pool in time domain is not in the first time window.

In one embodiment, a start time of the first time-frequency resource pool in time domain is before a start time of the second time-frequency resource pool in time domain.

In one embodiment, an end time of the first time-frequency resource pool in time domain is before an end time of the second time-frequency resource pool in time domain.

In one embodiment, the first time-frequency resource pool is a first-type time-frequency resource pool.

In one embodiment, the second time-frequency resource pool is a second-type time-frequency resource pool.

In one embodiment, in terms of time domain: among all second-type time-frequency resource pools, the second time-frequency resource pool is a second-type time-frequency resource pool of which a start time is nearest to the first instant of time.

In one embodiment, in terms of time domain: among all second-type time-frequency resource pools, the second time-frequency resource pool is a second-type time-frequency resource pool of which a start time is later than and nearest to the first instant of time.

In one embodiment, in terms of time domain: among all second-type time-frequency resource pools, the second time-frequency resource pool is a second-type time-frequency resource pool of which a start time is earlier than and nearest to the first instant of time.

In one embodiment, in terms of time domain: among all second-type time-frequency resource pools, the second time-frequency resource pool is a second-type time-frequency resource pool of which an end time is nearest to the first instant of time.

In one embodiment, in terms of time domain: among all second-type time-frequency resource pools, the second time-frequency resource pool is a second-type time-frequency resource pool of which an end time is later than and nearest to the first instant of time.

In one embodiment, in terms of time domain: among all second-type time-frequency resource pools, the second time-frequency resource pool is a second-type time-frequency resource pool of which an end time is earlier than and nearest to the first instant of time.

In one embodiment, the first instant of time and a second instant of time are respectively two different boundary instants of the first time-frequency resource pool in time domain.

In one embodiment, the first instant of time is a start time of the first time-frequency resource pool in time domain, while a second instant of time is an end time of the first time-frequency resource pool in time domain.

In one embodiment, a second instant of time is a start time of the first time-frequency resource pool in time domain, while the first instant of time is an end time of the first time-frequency resource pool in time domain.

In one embodiment, in terms of time domain: among all second-type time-frequency resource pools, the second time-frequency resource pool is a second-type time-frequency resource pool of which a start time is nearest to the second instant of time.

In one embodiment, in terms of time domain: among all second-type time-frequency resource pools, the second time-frequency resource pool is a second-type time-frequency resource pool of which a start time is later than and nearest to the second instant of time.

In one embodiment, in terms of time domain: among all second-type time-frequency resource pools, the second time-frequency resource pool is a second-type time-frequency resource pool of which a start time is earlier than and nearest to the second instant of time.

In one embodiment, in terms of time domain: among all second-type time-frequency resource pools, the second time-frequency resource pool is a second-type time-frequency resource pool of which an end time is nearest to the second instant of time.

In one embodiment, in terms of time domain: among all second-type time-frequency resource pools, the second time-frequency resource pool is a second-type time-frequency resource pool of which an end time is later than and nearest to the second instant of time.

In one embodiment, in terms of time domain: among all second-type time-frequency resource pools, the second time-frequency resource pool is a second-type time-frequency resource pool of which an end time is earlier than and nearest to the second instant of time.

In one embodiment, time-domain resources occupied by the first time-frequency resource pool are contiguous.

In one embodiment, time-domain resources occupied by a said first-type time-frequency resource pool are contiguous.

In one embodiment, the first-type time-frequency resource pool is defined in a search space set.

In one embodiment, time-domain resources occupied by the second time-frequency resource pool are contiguous.

In one embodiment, time-domain resources occupied by a said second-type time-frequency resource pool are contiguous.

In one embodiment, the second-type time-frequency resource pool is defined in another search space set.

In one embodiment, the phrase that the first time-frequency resource pool and the second time-frequency resource pool are associated means: joint decoding can be performed on a signal received in the first time-frequency resource pool and a signal received in the second time-frequency resource pool.

In one embodiment, the phrase that the first time-frequency resource pool and the second time-frequency resource pool are not associated means: joint decoding is not performed on a signal received in the first time-frequency resource pool and a signal received in the second time-frequency resource pool.

In one embodiment, the phrase that the first time-frequency resource pool and the second time-frequency resource pool are associated means: joint demodulation can be performed on a signal received in the first time-frequency resource pool and a signal received in the second time-frequency resource pool.

In one embodiment, the phrase that the first time-frequency resource pool and the second time-frequency resource pool are not associated means: joint demodulation is not performed on a signal received in the first time-frequency resource pool and a signal received in the second time-frequency resource pool.

In one embodiment, the phrase that the first time-frequency resource pool and the second time-frequency resource pool are associated means: a signal received in the first time-frequency resource pool and a signal received in the second time-frequency resource pool can be combined.

In one embodiment, the phrase that the first time-frequency resource pool and the second time-frequency resource pool are not associated means: a signal received in the first time-frequency resource pool and a signal received in the second time-frequency resource pool shall be decoded respectively.

In one embodiment, the phrase that the first time-frequency resource pool and the second time-frequency resource pool are associated means: the first node assumes that a signal received in the first time-frequency resource pool and a signal received in the second time-frequency resource pool can be combined.

In one embodiment, the phrase that the first time-frequency resource pool and the second time-frequency resource pool are not associated means: the first node does not assume that a signal received in the first time-frequency resource pool and a signal received in the second time-frequency resource pool can be combined.

In one embodiment, when the first time-frequency resource pool and the second time-frequency resource pool are associated: the first node performs at least one of decoding on a signal received in the first time-frequency resource pool, decoding on a signal received in the second time-frequency resource pool, or combining of a signal received in the first time-frequency resource pool and a signal received in the second time-frequency resource pool.

In one embodiment, when the first time-frequency resource pool and the second time-frequency resource pool are not associated: the first node performs at least one of decoding on a signal received in the first time-frequency resource pool, or decoding on a signal received in the second time-frequency resource pool.

In one embodiment, when the first time-frequency resource pool and the second time-frequency resource pool are not associated: the first node does not perform combination of a signal received in the first time-frequency resource pool and the second time-frequency resource pool.

In one embodiment, the meaning of combination includes coherent combining.

In one embodiment, the meaning of combination includes maximum ratio combining (MRC).

In one embodiment, the meaning of combination includes soft combining.

In one embodiment, the meaning of combination includes modulation symbol combining.

In one embodiment, the meaning of combination includes demodulation information combining.

In one embodiment, the meaning of combination includes decoder output combining.

In one embodiment, the meaning of combination includes joint demodulating.

In one embodiment, the meaning of combination includes joint decoding.

In one embodiment, the phrase that the first time-frequency resource pool and the second time-frequency resource pool are associated means: two repetitions of transmission of a same information bit block can be respectively mapped to the first time-frequency resource pool and the second time-frequency resource pool.

In one embodiment, the phrase that the first time-frequency resource pool and the second time-frequency resource pool are associated means: two repetitions of transmission of a same information bit block are respectively mapped to the first time-frequency resource pool and the second time-frequency resource pool.

In one embodiment, the phrase that the first time-frequency resource pool and the second time-frequency resource pool are not associated means: reception in the first time-frequency resource pool and reception in the second time-frequency resource pool are treated as mutually independent receptions.

In one embodiment, the phrase that the first time-frequency resource pool and the second time-frequency resource pool are not associated means: an information bit block transmitted in the first time-frequency resource pool and an information bit block transmitted in the second time-frequency resource pool are treated as different information bit blocks.

In one embodiment, the phrase that the first time-frequency resource pool and the second time-frequency resource pool are associated means: a signal received in the first time-frequency resource pool and a signal received in the second time-frequency resource pool can be jointly used for determining whether a first-type channel is detected.

In one embodiment, the phrase that the first time-frequency resource pool and the second time-frequency resource pool are associated means: combining a signal received in the first time-frequency resource pool and a signal received in the second time-frequency resource pool; if it is determined according to CRC of a combined signal that decoding is correct, determining that a first-type channel is detected in the first time-frequency resource pool and the second time-frequency resource pool; otherwise, determining that no first-type channel is detected in the first time-frequency resource pool and the second time-frequency resource pool.

In one embodiment, the first time-frequency resource pool and the second time-frequency resource pool are PDCCH candidates respectively.

In one subembodiment, the first time-frequency resource pool and the second time-frequency resource pool correspond to a same PDCCH candidate index.

In one embodiment, the phrase that the first time-frequency resource pool and the second time-frequency resource pool are associated means: the first time-frequency resource pool and the second time-frequency resource pool can carry one and the other of two repetitions of transmission of an information bit block respectively.

In one embodiment, the phrase that the first time-frequency resource pool and the second time-frequency resource pool are associated means: the first node assumes that two repetitions of an information bit block can be transmitted respectively in the first time-frequency resource pool and the second time-frequency resource pool.

In one embodiment, the phrase that the first time-frequency resource pool and the second time-frequency resource pool are not associated means: the first node does not assume that two repetitions of an information bit block can be transmitted respectively in the first time-frequency resource pool and the second time-frequency resource pool.

In one embodiment, the phrase that the first time-frequency resource pool and the second time-frequency resource pool are associated means: the first node assumes that two repetitions of an information bit block are transmitted respectively in the first time-frequency resource pool and the second time-frequency resource pool.

In one embodiment, the phrase that the first time-frequency resource pool and the second time-frequency resource pool are not associated means: the first node does not assume that two repetitions of an information bit block are transmitted respectively in the first time-frequency resource pool and the second time-frequency resource pool.

In one embodiment, the phrase that the first time-frequency resource pool and the second time-frequency resource pool are associated means: when the first time-frequency resource pool and the second time-frequency resource pool are both used for transmitting information bit blocks, there is always a same information bit block being transmitted in the first time-frequency resource pool and the second time-frequency resource pool.

In one embodiment, a time-frequency resource pool is either used for transmitting information bit blocks or not used for transmitting information bit blocks.

In one embodiment, the phrase that the first time-frequency resource pool and the second time-frequency resource pool are associated means: when the first time-frequency resource pool and the second time-frequency resource pool are both used for transmitting information bit blocks, there is always a same information bit block of which two repetitions are respectively transmitted in the first time-frequency resource pool and the second time-frequency resource pool.

In one embodiment, the phrase that the first time-frequency resource pool and the second time-frequency resource pool are associated means: when either the first time-frequency resource pool or the second time-frequency resource pool is used for transmitting an information bit block, the other of the two time-frequency resource pools is also used for transmitting the information bit block.

In one embodiment, the phrase that the first time-frequency resource pool and the second time-frequency resource pool are associated means: when either the first time-frequency resource pool or the second time-frequency resource pool is used for transmitting an information bit block, the first time-frequency resource pool and the second time-frequency resource pool are respectively used for two repetitions of transmission of the information bit block.

In one embodiment, the first time-frequency resource pool is reserved for a PDSCH.

In one embodiment, the second time-frequency resource pool is reserved for a PDSCH.

In one embodiment, the first time-frequency resource pool is reserved for a PUSCH.

In one embodiment, the second time-frequency resource pool is reserved for a PUSCH.

In one embodiment, the first time-frequency resource pool is reserved for a Physical Sidelink Shared CHannel (PSSCH).

In one embodiment, the first time-frequency resource pool is reserved for a Physical Sidelink Control CHannel (PSCCH).

In one embodiment, the second time-frequency resource pool is reserved for a PSSCH.

In one embodiment, the second time-frequency resource pool is reserved for a PSCCH.

In one embodiment, the first node comprises one or multiple TRPs.

In one embodiment, the second node comprises one or multiple TRPs.

In one embodiment, the transmission in the present disclosure is only limited to a transmission for the first node.

In one embodiment, the transmission in the present disclosure is only limited to a transmission between the first node and the second node.

In one embodiment, the information bit block in the present disclosure is only limited to an information bit block transmitted for the first node.

In one embodiment, the information bit block in the present disclosure is only limited to an information bit block transmitted by or for the first node.

Embodiment 2

Figure 2:
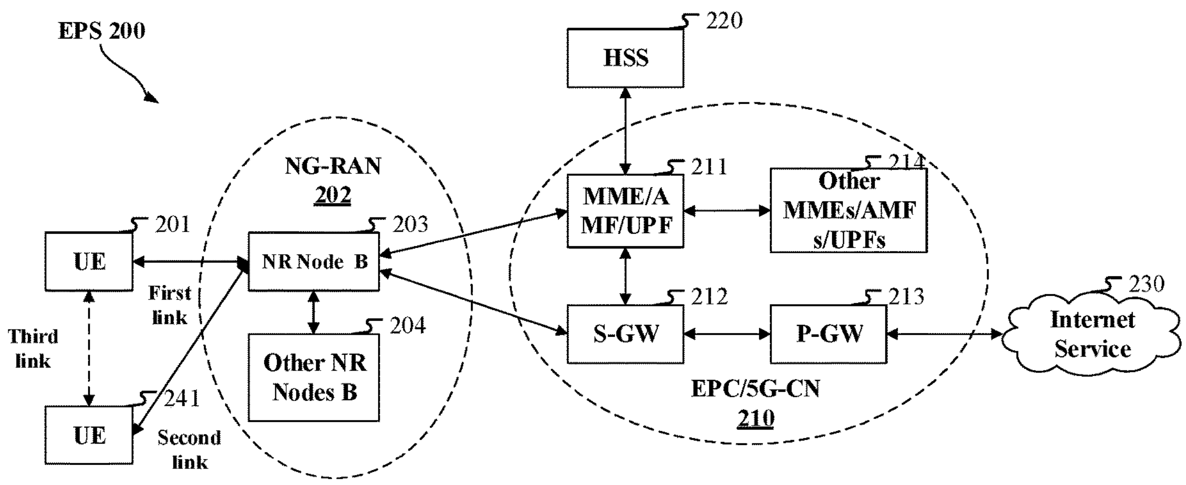
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the first node in the present disclosure.

In one embodiment, the gNB203 corresponds to the first node in the present disclosure.

In one embodiment, the UE 201 corresponds to the second node in the present disclosure.

In one embodiment, the UE 241 corresponds to the second node in the present disclosure.

In one embodiment, the gNB203 corresponds to the second node in the present disclosure.

Embodiment 3

Figure 3:
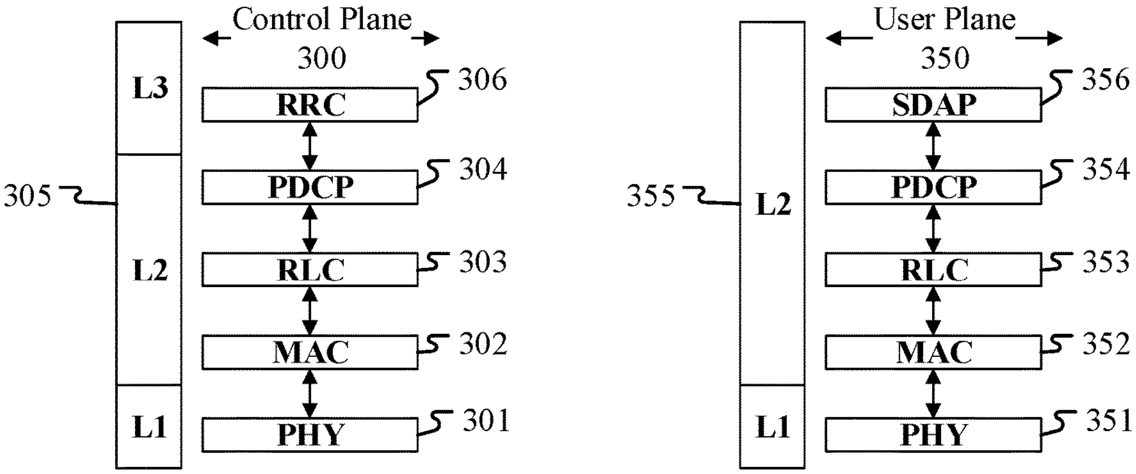
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the DCI in the present disclosure is generated by the PHY 301.

Embodiment 4

Figure 4:
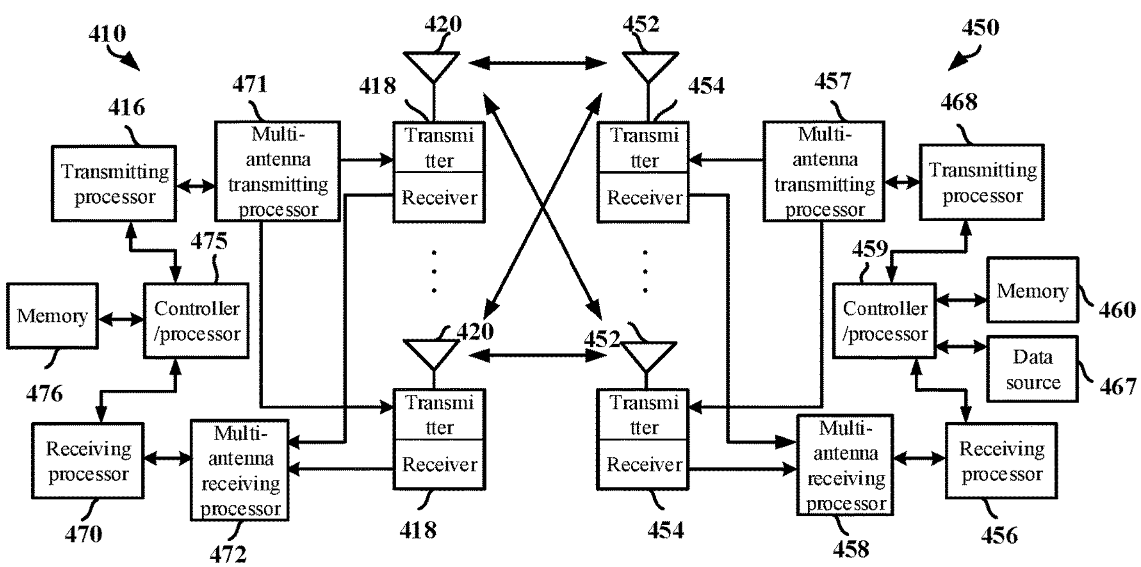
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the second node in the present disclosure comprises the second communication device 450, and the first node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second node is a UE, and the first node is a base station.

In one subembodiment, the second node is a relay node, and the first node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least transmits in at least one of a first time-frequency resource pool or a second time-frequency resource pool in the present disclosure; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one subembodiment, the second communication device 450 corresponds to the second node in the present disclosure.

In one embodiment, the second communication device 450 comprises a memory that stores computer readable instruction program, the computer readable instruction program generates an action when executed by at least one processor, which includes: transmitting in at least one of a first time-frequency resource pool or a second time-frequency resource pool in the present disclosure; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one subembodiment, the second communication device 450 corresponds to the second node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least monitors in a first time-frequency resource pool and a second time-frequency resource pool; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one subembodiment, the first communication device 410 corresponds to the first node in the present disclosure.

In one embodiment, the first communication device 410 comprises a memory that stores computer readable instruction program, the computer readable instruction program generates an action when executed by at least one processor, which includes: monitoring in a first time-frequency resource pool and a second time-frequency resource pool; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one subembodiment, the first communication device 410 corresponds to the first node in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting in at least one of the first time-frequency resource pool or the second time-frequency resource pool in the present disclosure.

In one embodiment, at least one of the antenna 420, the receiver 418, the multi-antenna receiving processor 472, the receiving processor 470, the controller/processor 475 or the memory 476 is used for monitoring in the first time-frequency resource pool and the second time-frequency resource pool in the present disclosure.

Embodiment 5

Figure 5:
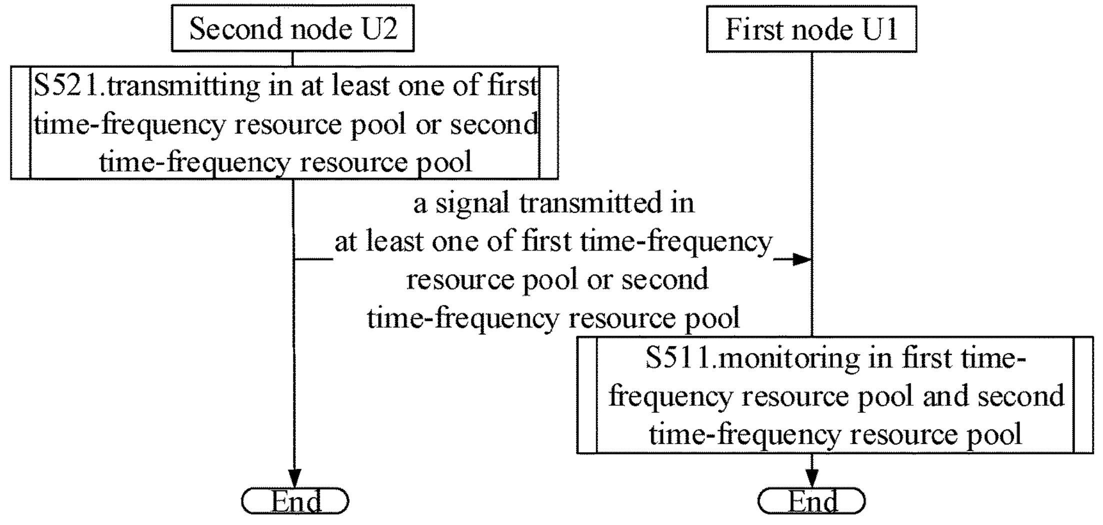
FIG. 5 illustrates a flowchart of signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communication via an air interface.

The first node U1 monitors in a first time-frequency resource pool and a second time-frequency resource pool in step S511.

The second node U2 transmits in at least one of a first time-frequency resource pool or a second time-frequency resource pool in step S521.

In Embodiment 5, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one subembodiment of the Embodiment 5, the phrase that the first time-frequency resource pool and the second time-frequency resource pool are associated means: a PDCCH candidate comprised in the first time-frequency resource pool and a PDCCH candidate comprised in the second time-frequency resource pool are associated.

In one subembodiment of the Embodiment 5, the phrase that the first time-frequency resource pool and the second time-frequency resource pool are associated means: the first time-frequency resource pool and the second time-frequency resource pool collectively comprise a first-type PDCCH candidate, the first-type PDCCH candidate being a PDCCH candidate reserved for one repetition of a possible information bit block in the first time-frequency resource pool and another repetition of the information bit block in the second time-frequency resource pool.

In one subembodiment of the Embodiment 5, the first time-frequency resource pool and the second time-frequency resource pool are respectively defined in different search space sets.

In one subembodiment of the Embodiment 5, the first time-frequency resource pool and the second time-frequency resource pool are respectively defined in different semi-persistent configurations.

In one subembodiment of the Embodiment 5, the first time window comprises K contiguous time unit(s), the K contiguous time unit(s) comprising the first instant of time, K being a positive integer.

In one subembodiment of the Embodiment 5, whether the first time-frequency resource pool is configured with a first configuration is used to indicate a number of time units comprised in the first time window.

In one embodiment, the first node U1 is the first node in the present disclosure.

In one embodiment, the second node U2 is the second node in the present disclosure.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises a sidelink.

In one embodiment, an air interface between the second node U2 and the first node U1 comprises a radio interface between a base station and a UE.

In one embodiment, the second node U2 transmits a signal in only one of the first time-frequency resource pool or the second time-frequency resource pool.

In one embodiment, the second node U2 transmits two repetitions of an information bit block respectively in the first time-frequency resource pool and the second time-frequency resource pool.

In one embodiment, the second node U2 transmits a signal in only one of the first time-frequency resource pool or the second time-frequency resource pool, or, the second node U2 transmits two repetitions of an information bit block respectively in the first time-frequency resource pool and the second time-frequency resource pool.

In one embodiment, the second node U2 transmits a signal in only one of the first time-frequency resource pool or the second time-frequency resource pool, or, the second node U2 transmits two repetitions of an information bit block respectively in the first time-frequency resource pool and the second time-frequency resource pool, or, the second node U2 transmits different information bit blocks respectively in the first time-frequency resource pool and the second time-frequency resource pool.

In one embodiment, the second node U2 transmits two repetitions of an information bit block respectively in the first time-frequency resource pool and the second time-frequency resource pool, or, the second node U2 transmits different information bit blocks respectively in the first time-frequency resource pool and the second time-frequency resource pool.

Embodiment 6

Figure 6:
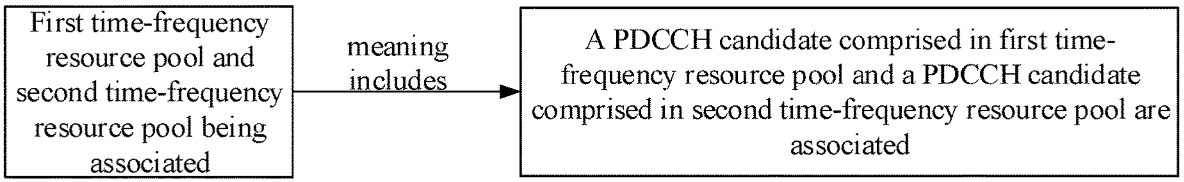
FIG. 6 illustrates an explanatory diagram of the meaning of a first time-frequency resource pool and a second time-frequency resource pool being associated according to one embodiment of the present disclosure.

Embodiment 6 illustrates an explanatory diagram of the meaning of a first time-frequency resource pool and a second time-frequency resource pool being associated, as shown in FIG. 6.

In Embodiment 6, the phrase that a first time-frequency resource pool and a second time-frequency resource pool are associated means that a PDCCH candidate comprised in the first time-frequency resource pool and a PDCCH candidate comprised in the second time-frequency resource pool are associated.

In one embodiment, the PDCCH candidate is used for monitoring Downlink Control Information (DCI).

In one embodiment, the PDCCH candidate is composed of one or more of CCEs.

In one embodiment, the PDCCH candidate is reserved for transmitting any possible DCI.

In one embodiment, the PDCCH candidate is defined targeting a search space set.

In one embodiment, the first time-frequency resource pool and the second time-frequency resource pool respectively comprise a PDCCH candidate.

In one embodiment, the first time-frequency resource pool and the second time-frequency resource pool respectively comprise only one PDCCH candidate.

In one embodiment, the first time-frequency resource pool and the second time-frequency resource pool are respectively used for mapping a PDCCH candidate.

In one embodiment, the first time-frequency resource pool is time-frequency resources occupied by a PDCCH candidate.

In one embodiment, the second time-frequency resource pool is time-frequency resources occupied by another PDCCH candidate.

In one embodiment, the meaning of a time-frequency resource pool comprising a PDCCH candidate includes: the PDCCH candidate is mapped into the time-frequency resource pool.

In one embodiment, the meaning of a time-frequency resource pool comprising a PDCCH candidate includes: the time-frequency resource pool comprises time-frequency resources used for mapping the PDCCH candidate.

In one embodiment, a PDCCH candidate comprised in one time-frequency resource pool refers to a PDCCH candidate mapped into the time-frequency resource pool.

In one embodiment, the meaning of a time-frequency resource pool being used for mapping a PDCCH candidate includes: CCEs constituting the PDCCH candidate are partially or entirely mapped into time-frequency resources in the time-frequency resource pool.

In one embodiment, the phrase that the first time-frequency resource pool and the second time-frequency resource pool are not associated means: a PDCCH candidate comprised in the first time-frequency resource pool and a PDCCH candidate comprised in the second time-frequency resource pool are not associated.

In one embodiment, the phrase that the first time-frequency resource pool and the second time-frequency resource pool are not associated means: configurations for PDCCH candidate-related rules in a higher layer signaling are not used between a PDCCH candidate comprised in the first time-frequency resource pool and a PDCCH candidate comprised in the second time-frequency resource pool.

In one embodiment, the phrase that the first time-frequency resource pool and the second time-frequency resource pool are not associated means: the first node in the present disclosure is not configured to associate a PDCCH candidate comprised in the first time-frequency resource pool with a PDCCH candidate comprised in the second time-frequency resource pool.

In one embodiment, the higher layer signaling in the present disclosure comprises at least one of an RRC signaling or a MAC CE signaling.

In one embodiment, the higher layer signaling in the present disclosure is for a physical layer.

In one embodiment, the higher layer signaling in the present disclosure is for a MAC layer.

In one embodiment, the phrase that the first time-frequency resource pool and the second time-frequency resource pool are not associated means: a PDCCH candidate comprised in the first time-frequency resource pool and a PDCCH candidate comprised in the second time-frequency resource pool are mutually independent.

In one embodiment, the first node in the present disclosure is configured with an association between a first search space set and a second search space set; the first time-frequency resource pool is defined in the first search space set, and the second time-frequency resource pool is defined in the second search space set.

In one embodiment, the first node in the present disclosure is configured as follows: the first time-frequency resource pool and the second time-frequency resource pool can be associated.

In one embodiment, the first node in the present disclosure is configured as follows: a PDCCH candidate comprised in the first time-frequency resource pool and a PDCCH candidate comprised in the second time-frequency resource pool can be associated.

In one embodiment, two PDCCH candidates being associated refer to two PDCCH candidates being associated according to configuration of a higher layer signaling.

In one embodiment, two PDCCH candidates being associated refer to two PDCCH candidates being associated according to configuration of an RRC signaling.

In one embodiment, two PDCCH candidates being associated refer to two PDCCH candidates being associated according to configuration of a MAC CE signaling.

In one embodiment, two PDCCH candidates being associated respectively belong to different Control resource sets (CORESETs).

In one embodiment, two PDCCH candidates being associated are respectively defined in different search space sets.

In one embodiment, two PDCCH candidates being associated respectively correspond to different CORESETPoolIndexes.

In one embodiment, two PDCCH candidates being associated respectively correspond to different Transmission Reception Points (TRPs).

In one embodiment, two PDCCH candidates being associated respectively correspond to different cells.

In one embodiment, a rule of association between PDCCH candidates is configurable.

In one embodiment, a rule of association between PDCCH candidates is configured by a higher-layer signaling.

In one embodiment, a rule of association between PDCCH candidates is configured by an RRC signaling.

In one embodiment, a rule of association between PDCCH candidates is configured by a MAC CE signaling.

In one embodiment, the meaning of two PDCCH candidates being associated includes: the two PDCCH candidates are allowed to bear one and the other of two repetitions of transmission of an information bit block.

In one embodiment, the meaning of two PDCCH candidates being associated includes: when the two PDCCH candidates are both used for transmitting an information bit block, the information bit blocks transmitted in the two PDCCH candidates are always a same information bit block.

In one embodiment, the two PDCCH candidates are: one PDCCH candidate comprised in the first time-frequency resource pool and one PDCCH candidate comprised in the second time-frequency resource pool.

In one embodiment, the PDCCH candidate in the present disclosure is only for the first node in the present disclosure.

In one embodiment, the PDCCH candidate in the present disclosure is only for the first node or the second node in the present disclosure.

In one embodiment, a PDCCH candidate is either used for transmitting an information bit block or not used for transmitting an information bit block.

In one embodiment, when either of two PDCCH candidates being associated is used for transmitting an information bit block, the other of the two PDCCH candidates being associated is either used for transmitting an information bit block or not used for transmitting an information bit block.

In one embodiment, the meaning of two PDCCH candidates being associated includes: when any of the two PDCCH candidates is used for transmitting one information bit block, the other of the two PDCCH candidates is used for transmitting the information bit block.

In one embodiment, the meaning of two PDCCH candidates being associated includes: when any of the two PDCCH candidates is used for transmitting one information bit block, the two PDCCH candidates are always used for transmitting the same information bit block.

In one embodiment, the meaning of two PDCCH candidates being associated includes: when any of the two PDCCH candidates is used for transmitting one information bit block, the two PDCCH candidates are always used for transmitting two repetitions of the information bit block respectively.

In one embodiment, the information bit block in the present disclosure comprises one piece of DCI.

In one embodiment, the information bit block in the present disclosure comprises a positive integer number of bit(s).

In one embodiment, the information bit block in the present disclosure comprises information bits of a UL-SCH.

In one embodiment, the information bit block in the present disclosure comprises information bits of a DL-SCH.

In one embodiment, the phrase that the first time-frequency resource pool and the second time-frequency resource pool are associated means: in a process of calculating a number of allocated PDCCH candidates, a PDCCH candidate comprised in the first time-frequency resource pool and a PDCCH candidate comprised in the second time-frequency resource pool being associated are counted for once as a whole.

In one subembodiment, the PDCCH candidate comprised in the first time-frequency resource pool is counted separately for once or not counted separately.

In one subembodiment, the PDCCH candidate comprised in the second time-frequency resource pool is counted separately for once or not counted separately.

In one embodiment, the phrase that the first time-frequency resource pool and the second time-frequency resource pool are not associated means: in a process of calculating a number of allocated PDCCH candidates, a PDCCH candidate comprised in the first time-frequency resource pool and a PDCCH candidate comprised in the second time-frequency resource pool being associated are only counted separately.

In one embodiment, the PDCCH candidate allocated to a search space set to which the first time-frequency resource pool belongs is always greater than zero (0).

In one embodiment, the PDCCH candidate allocated to a search space set to which the second time-frequency resource pool belongs is always greater than zero (0).

In one embodiment, the meaning of two PDCCH candidates being associated includes: the two PDCCH candidates can respectively bear one and the other of two repetitions of transmission of an information bit block.

In one embodiment, the meaning of two PDCCH candidates being associated includes: the first node in the present disclosure assumes that two repetitions of an information bit block can be respectively transmitted in the two PDCCH candidates.

In one embodiment, the meaning of two PDCCH candidates not being associated includes: the first node in the present disclosure does not assume that two repetitions of an information bit block can be respectively transmitted in the two PDCCH candidates.

In one embodiment, the meaning of two PDCCH candidates being associated includes: the first node in the present disclosure assumes that two repetitions of an information bit block are respectively transmitted in the two PDCCH candidates.

In one embodiment, the meaning of two PDCCH candidates not being associated includes: the first node in the present disclosure does not assume that two repetitions of an information bit block are respectively transmitted in the two PDCCH candidates.

In one embodiment, two PDCCH candidates being associated have a same starting CCE index.

In one embodiment, two PDCCH candidates being associated comprise equal numbers of CCEs.

In one embodiment, a Transmission Configuration Indicator (TCI) configured to the first time-frequency resource pool is different from a TCI configured to the second time-frequency resource pool.

In one embodiment, a TCI configured to the first time-frequency resource pool and a TCI configured to the second time-frequency resource pool are respectively for different cells.

Embodiment 7

Embodiment 7 illustrates an explanatory diagram of the meaning of a first time-frequency resource pool and a second time-frequency resource pool being associated according to one embodiment of the present disclosure, as shown in FIG. 7.

In Embodiment 7, the phrase that a first time-frequency resource pool and a second time-frequency resource pool are associated means that the first time-frequency resource pool and the second time-frequency resource pool collectively comprise a first-type PDCCH candidate; herein, the first-type PDCCH candidate being a PDCCH candidate reserved for one repetition of a possible information bit block in the first time-frequency resource pool and another repetition of the information bit block in the second time-frequency resource pool.

In one embodiment, a said first-type PDCCH candidate is constituted by resources occupied by two PDCCH candidates being associated.

In one embodiment, a said first-type PDCCH candidate is a combined PDCCH candidate.

In one embodiment, the phrase that the first time-frequency resource pool and the second time-frequency resource pool collectively comprise a said first-type PDCCH candidate means that: the first time-frequency resource pool and the second time-frequency resource pool are jointly used for mapping the said first-type PDCCH candidate.

In one embodiment, the phrase that the first time-frequency resource pool and the second time-frequency resource pool collectively comprise a said first-type PDCCH candidate means that: a part of and the rest of the said first-type PDCCH candidate are respectively mapped into the first time-frequency resource pool and the second time-frequency resource pool.

In one embodiment, the phrase that the first time-frequency resource pool and the second time-frequency resource pool are not associated means: the first-type PDCCH candidate does not exist for the first time-frequency resource pool and the second time-frequency resource pool; the first time-frequency resource pool comprises a PDCCH candidate reserved for transmission of a potential/possible information bit block in the first time-frequency resource pool, while the second time-frequency resource pool comprises a PDCCH candidate reserved for transmission of a potential/possible information bit block in the second time-frequency resource pool.

In one embodiment, when the first time-frequency resource pool and the second time-frequency resource pool are not associated: a PDCCH candidate comprised in the first time-frequency resource pool and a PDCCH candidate comprised in the second time-frequency resource pool are individual PDCCH candidates.

Embodiment 8

Embodiment 8 illustrates a schematic diagram of determining a first time-frequency resource pool and a second time-frequency resource pool according to one embodiment of the present disclosure, as shown in FIG. 8.

In Embodiment 8, a first time-frequency resource pool and a second time-frequency resource pool are respectively defined in different search space sets.

In one embodiment, the first time-frequency resource pool is a first-type time-frequency resource pool.

In one embodiment, the second time-frequency resource pool is a second-type time-frequency resource pool.

In one embodiment, time-domain resources occupied by a said first-type time-frequency resource pool are contiguous.

In one embodiment, time-domain resources occupied by a said second-type time-frequency resource pool are contiguous.

In one embodiment, the first-type time-frequency resource pool is defined in a search space set.

In one embodiment, the second-type time-frequency resource pool is defined in another search space set.

In one embodiment, a said search space set comprises a search space.

In one embodiment, for information about the said search space set, refer to Chapter 10.1 of 3GPP TS38.213.

In one embodiment, a said search space set is configured in a SearchSpace Information Element (IE).

In one embodiment, a said search space set is associated with one CORESET.

In one embodiment, a said first-type time-frequency resource pool is used for mapping a PDCCH candidate.

In one embodiment, a said second-type time-frequency resource pool is used for mapping a PDCCH candidate.

In one embodiment, a said first-type time-frequency resource pool is time-frequency resources occupied by a PDCCH candidate.

In one embodiment, a said second-type time-frequency resource pool is time-frequency resources occupied by a PDCCH candidate.

In one embodiment, the first time-frequency resource pool and the second time-frequency resource pool are both used for mapping PDCCH candidates.

In one embodiment, the first-type time-frequency resource pool and the second-type time-frequency resource pool are corresponding to a same CORESET.

In one embodiment, the first-type time-frequency resource pool and the second-type time-frequency resource pool are respectively corresponding to different CORESETs.

In one embodiment, the first-type time-frequency resource pool and the second-type time-frequency resource pool are defined in a same search space set, the first-type time-frequency resource pool and the second-type time-frequency resource pool respectively occupying different time-domain resources.

In one embodiment, the first-type time-frequency resource pool and the second-type time-frequency resource pool are already divided in advance.

In one embodiment, the first-type time-frequency resource pool and the second-type time-frequency resource pool are divided based on configurations by a higher layer signaling.

In one embodiment, the first-type time-frequency resource pool and the second-type time-frequency resource pool can be respectively used by different TRPs for information transmissions.

Embodiment 9

Embodiment 9 illustrates a schematic diagram of determining a first time-frequency resource pool and a second time-frequency resource pool according to one embodiment of the present disclosure, as shown in FIG. 9.

In Embodiment 9, a first time-frequency resource pool and a second time-frequency resource pool are respectively defined in different semi-persistent configurations.

In one embodiment, a said semi-persistent configuration comprises: configuration of a Semi-Persistent Scheduling (SPS).

In one embodiment, the configuration of an SPS is partially or entirely defined in one IE.

In one embodiment, a said semi-persistent configuration comprises: configuration of a Configured Grant (CG).

In one embodiment, the configuration of a CG is partially or entirely defined in one IE.

In one embodiment, the first time-frequency resource pool and the second time-frequency resource pool respectively correspond to different semi-persistent configurations.

In one embodiment, the first time-frequency resource pool and the second time-frequency resource pool are respectively time-frequency resource pools indicated by different SPSs.

In one embodiment, the first time-frequency resource pool and the second time-frequency resource pool are respectively time-frequency resource pools indicated by different CGs.

In one embodiment, the first time-frequency resource pool and the second time-frequency resource pool are indicated by an RRC signaling.

In one embodiment, the first time-frequency resource pool and the second time-frequency resource pool are jointly indicated by an RRC signaling and DCI.

In one embodiment, the first time-frequency resource pool and the second time-frequency resource pool correspond to a same HARQ process number/HARQ Process ID.

In one embodiment, the first time-frequency resource pool and the second time-frequency resource pool respectively correspond to different HARQ process numbers/HARQ Process IDs.

Embodiment 10

Embodiment 10 illustrates a schematic diagram of relations between a first time window, K contiguous time unit(s) and a first instant of time according to one embodiment of the present disclosure, as shown in FIG. 10.

In Embodiment 10, a first time window comprises K contiguous time unit(s), the K contiguous time unit(s) comprising the first instant of time, K being a positive integer.

In one embodiment, the K is configurable.

In one embodiment, the K is a positive integer.

In one embodiment, the K is equal to 1.

In one embodiment, the K is equal to 2.

In one embodiment, the K is a multiple of 2.

In one embodiment, the K is a multiple of 7.

In one embodiment, the K is a multiple of 14.

In one embodiment, the K is no greater than 1024.

In one embodiment, the K is no greater than 10240.

In one embodiment, a said time unit is a slot.

In one embodiment, a said time unit is a sub-slot.

In one embodiment, a said time unit is a span.

In one embodiment, a said time unit is a multicarrier symbol.

In one embodiment, a said time unit is time-domain resources occupied by a multicarrier symbol.

Embodiment 11

Embodiment 11 illustrates a schematic diagram of a number of time units comprised in a first time window according to one embodiment of the present disclosure, as shown in FIG. 11.

In Embodiment 11, whether a first time-frequency resource pool is configured with a first configuration is used to indicate a number of time units comprised in a first time window.

In one embodiment, whether the first time-frequency resource pool is configured with a first configuration implicitly indicates a number of time units comprised in the first time window.

In one embodiment, when the first time-frequency resource pool is configured with a first configuration, the first time window is comprised of K1 time units; when the first time-frequency resource pool is not configured with a first configuration, the first time window is comprised of K2 time units; K1 and K2 are positive integers, and K1 is unequal to K2.

In one embodiment, the K in the present disclosure is equal to the K1 or the K2.

In one embodiment, the first configuration comprises DCI-related configuration indicated by a higher layer signaling.

In one embodiment, the first configuration comprises configuration of a DCI format.

In one embodiment, the first configuration comprises configuration of a field.

In one embodiment, the first configuration comprises configuration of a field in a DCI format.

In one embodiment, the meaning of the first time-frequency resource pool being configured with the first configuration includes: a DCI format 0_2 and a DCI format 1_2 are configured in definition of a search space set corresponding to the first time-frequency resource pool.

In one embodiment, the meaning of the first time-frequency resource pool being configured with the first configuration includes: a DCI format configured in definition of a search space set corresponding to the first time-frequency resource pool comprises a Priority indicator field.

In one embodiment, the meaning of the first time-frequency resource pool being not configured with the first configuration includes: a DCI format 0_2 and a DCI format 1_2 aren't configured in definition of a search space set corresponding to the first time-frequency resource pool.

In one embodiment, the meaning of the first time-frequency resource pool being not configured with the first configuration includes: a DCI format comprising a Priority indicator field is not configured in definition of a search space set corresponding to the first time-frequency resource pool.

In one embodiment, when both the first time-frequency resource pool and the second time-frequency resource pool are configured with a first configuration, the first time window is comprised of K1 time units; when either the first time-frequency resource pool or the second time-frequency resource pool is not configured with a first configuration, the first time window is comprised of K2 time units; K1 and K2 are positive integers, and K1 is unequal to K2.

In one embodiment, the phrase that both the first time-frequency resource pool and the second time-frequency resource pool are configured with the first configuration means that a DCI format 0_2 and a DCI format 1_2 are configured in both definition of a search space set corresponding to the first time-frequency resource pool and definition of a search space set corresponding to the second time-frequency resource pool.

In one embodiment, the meaning of the first time-frequency resource pool being configured with the first configuration includes: a same DCI format comprising a Priority indicator field is configured in both definition of a search space set corresponding to the first time-frequency resource pool and definition of a search space set corresponding to the second time-frequency resource pool.

In one embodiment, the phrase that either the first time-frequency resource pool or the second time-frequency resource pool is not configured with the first configuration means that a DCI format 0_2 and a DCI format 1_2 are not configured in either definition of a search space set corresponding to the first time-frequency resource pool or definition of a search space set corresponding to the second time-frequency resource pool.

In one embodiment, the phrase that either the first time-frequency resource pool or the second time-frequency resource pool is not configured with the first configuration means that there isn't a same DCI format comprising a Priority indicator field being configured in both definition of a search space set corresponding to the first time-frequency resource pool and definition of a search space set corresponding to the second time-frequency resource pool.

In one embodiment, the specific description of the DCI format 0_2 can be found in Chapter 7.3.1.1.3 of 3GPP TS38.212.

In one embodiment, the specific description of the DCI format 1_2 can be found in Chapter 7.3.1.2.3 of 3GPP TS38.212.

In one embodiment, the K1 is greater than the K2.

In one embodiment, the K2 is less than the K2.

In one embodiment, the K1 is no greater than 1024.

In one embodiment, the K2 is no greater than 1024.

In one embodiment, the K1 is no greater than 10240.

In one embodiment, the K2 is no greater than 10240.

In one embodiment, the K1 is configurable.

In one embodiment, the K2 is configurable.

Embodiment 12

Figure 12:
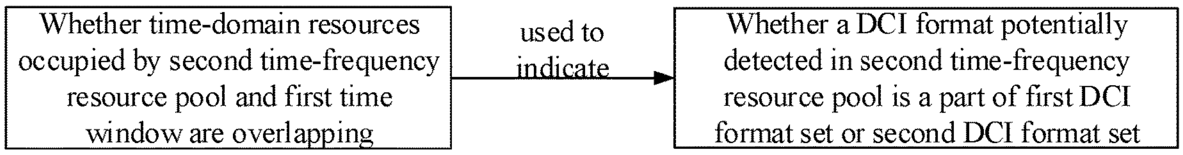
FIG. 12 illustrates a schematic diagram of a relation between whether time-domain resources occupied by a second time-frequency resource pool are overlapping with a first time window and a DCI format potentially detected in the second time-frequency resource pool according to one embodiment of the present disclosure.

Embodiment 12 illustrates a schematic diagram of a relation between whether time-domain resources occupied by a second time-frequency resource pool are overlapping with a first time window and a DCI format potentially detected in the second time-frequency resource pool according to one embodiment of the present disclosure, as shown in FIG. 12.

In Embodiment 12, whether time-domain resources occupied by a second time-frequency resource pool are overlapping with a first time window is used to indicate whether a DCI format potentially detected in the second time-frequency resource pool is one belonging to a first DCI format set or a second DCI format set.

In one embodiment, whether time-domain resources occupied by a second time-frequency resource pool are overlapping with a first time window implicitly indicates whether a DCI format potentially detected in the second time-frequency resource pool is one belonging to a first DCI format set or a second DCI format set.

In one embodiment, when time-domain resources occupied by a second time-frequency resource pool are overlapping with the first time window, a DCI format potentially detected in the second time-frequency resource pool is one belonging to a first DCI format set; when time-domain resources occupied by a second time-frequency resource pool are orthogonal with the first time window, a DCI format potentially detected in the second time-frequency resource pool is one belonging to a second DCI format set; the first DCI format set is different from the second DCI format set.

In one embodiment, the DCI format set comprises at least one DCI format.

In one embodiment, the DCI format set is configured in definition of a search space set.

In one embodiment, the first time-frequency resource set corresponds to the first DCI format set, and the second time-frequency resource set corresponds to the second DCI format set.

In one embodiment, the first DCI format set comprises DCI formats configured in definition of a search space set corresponding to the first time-frequency resource pool, and the second DCI format set comprises DCI formats configured in definition of a search space set corresponding to the second time-frequency resource pool.

In one embodiment, in a set of statements comprising {DCI formats configured in definition of a search space set corresponding to the second time-frequency resource pool do not comprise at least one DCI format configured in definition of a search space set corresponding to the first time-frequency resource pool, DCI formats configured in definition of a search space set corresponding to the first time-frequency resource pool do not comprise at least one DCI format configured in definition of a search space set corresponding to the second time-frequency resource pool}, at least one statement is established.

Embodiment 13

Figure 13:
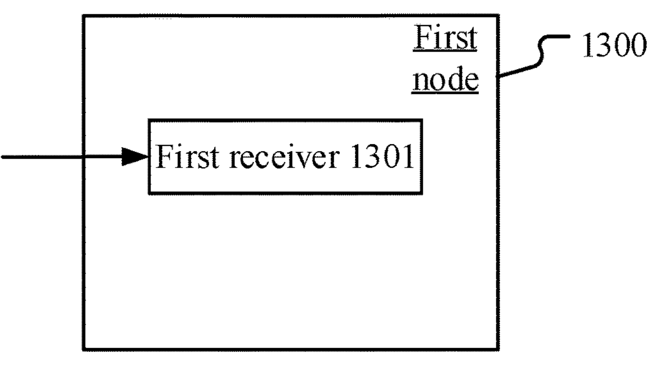
FIG. 13 illustrates a structure block diagram of a processing device in a first node according to one embodiment of the present disclosure.

Embodiment 13 illustrates a structure block diagram of a processing device in a first node, as shown in FIG. 13. In FIG. 13, a first node's processing device 1300 comprises a first receiver 1301.

In one embodiment, the first node 1300 is a UE.

In one embodiment, the first node 1300 is a base station.

In one embodiment, the first node 1300 is a relay node.

In one embodiment, the first node 1300 is vehicle-mounted equipment.

In one embodiment, the first node 1300 is a UE supporting V2X communications.

In one embodiment, the first node 1300 is a relay device supporting V2X communications.

In one embodiment, the first receiver 1301 comprises at least one of the antenna 420, the receiver 418, the multi-antenna receiving processor 472, the receiving processor 470, the controller/processor 475 or the memory 476 in FIG. 4 of the present disclosure.

In one embodiment, the first receiver 1301 comprises at least the first five of the antenna 420, the receiver 418, the multi-antenna receiving processor 472, the receiving processor 470, the controller/processor 475 and the memory 476 in FIG. 4 of the present disclosure.

In one embodiment, the first receiver 1301 comprises at least the first four of the antenna 420, the receiver 418, the multi-antenna receiving processor 472, the receiving processor 470, the controller/processor 475 and the memory 476 in FIG. 4 of the present disclosure.

In one embodiment, the first receiver 1301 comprises at least the first three of the antenna 420, the receiver 418, the multi-antenna receiving processor 472, the receiving processor 470, the controller/processor 475 and the memory 476 in FIG. 4 of the present disclosure.

In one embodiment, the first receiver 1301 comprises at least the first two of the antenna 420, the receiver 418, the multi-antenna receiving processor 472, the receiving processor 470, the controller/processor 475 and the memory 476 in FIG. 4 of the present disclosure.

In Embodiment 13, the first receiver 1301 monitors in a first time-frequency resource pool and a second time-frequency resource pool; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one embodiment, a meaning of the first time-frequency resource pool and the second time-frequency resource pool being associated comprises: a PDCCH candidate comprised in the first time-frequency resource pool and a PDCCH candidate comprised in the second time-frequency resource pool are associated.

In one embodiment, a meaning of the first time-frequency resource pool and the second time-frequency resource pool being associated comprises: the first time-frequency resource pool and the second time-frequency resource pool collectively comprise a first-type PDCCH candidate, the first-type PDCCH candidate being a PDCCH candidate reserved for one repetition of a possible information bit block in the first time-frequency resource pool and another repetition of the information bit block in the second time-frequency resource pool.

In one embodiment, the first time-frequency resource pool and the second time-frequency resource pool are respectively defined in different search space sets.

In one embodiment, the first time-frequency resource pool and the second time-frequency resource pool are respectively defined in different semi-persistent configurations.

In one embodiment, the first time window comprises K contiguous time unit(s), the K contiguous time unit(s) comprising the first instant of time, K being a positive integer.

In one embodiment, whether the first time-frequency resource pool is configured with a first configuration is used to indicate a number of time units comprised in the first time window.

In one embodiment, the first receiver 1301 monitors in a first time-frequency resource pool and a second time-frequency resource pool; herein, a first instant of time is a start time/an end time of the first time-frequency resource pool in time domain, the first instant of time being used to indicate a first time window; when time-domain resources occupied by the second time-frequency resource pool and the first time window are overlapping, a PDCCH candidate comprised in the first time-frequency resource pool and a PDCCH candidate comprised in the second time-frequency resource pool are associated; when time-domain resources occupied by the second time-frequency resource pool and the first time window are orthogonal, a PDCCH candidate comprised in the first time-frequency resource pool and a PDCCH candidate comprised in the second time-frequency resource pool are not associated.

In one subembodiment, the first time-frequency resource pool and the second time-frequency resource pool are respectively defined in different search space sets.

In one subembodiment, when time-domain resources occupied by the second time-frequency resource pool and the first time window are overlapping: the PDCCH candidate comprised in the first time-frequency resource pool and the PDCCH candidate comprised in the second time-frequency resource pool are associated based on an association configured between two search space sets.

In one embodiment, the first receiver 1301 monitors in a first time-frequency resource pool and a second time-frequency resource pool; herein, a first instant of time is a start time/an end time of the first time-frequency resource pool in time domain, the first instant of time being used to indicate a first time window; when time-domain resources occupied by the second time-frequency resource pool and the first time window are overlapping, a PDSCH (or PUSCH) comprised in the first time-frequency resource pool and a PDSCH (or PUSCH) comprised in the second time-frequency resource pool are associated; when time-domain resources occupied by the second time-frequency resource pool and the first time window are orthogonal, a PDSCH (or PUSCH) comprised in the first time-frequency resource pool and a PDSCH (or PUSCH) comprised in the second time-frequency resource pool are not associated.

In one subembodiment, the first time-frequency resource pool and the second time-frequency resource pool respectively belong to two different SPS configurations.

In one subembodiment, the first time-frequency resource pool and the second time-frequency resource pool respectively belong to two different CG configurations.

Embodiment 14

Figure 14:
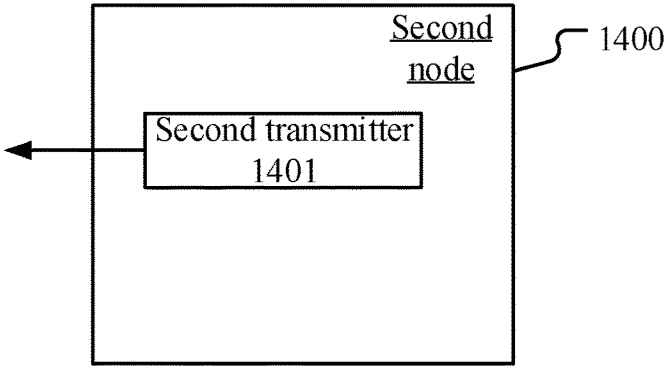
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, a second node's processing device 1400 comprises a second transmitter 1401.

In one embodiment, the second node 1400 is a UE.

In one embodiment, the second node 1400 is a relay node.

In one embodiment, the second node 1400 is vehicle-mounted equipment.

In one embodiment, the second node 1400 is a UE supporting V2X communications.

In one embodiment, the second node 1400 is a relay device supporting V2X communications.

In one embodiment, the second node 1400 is a base station.

In one embodiment, the second transmitter 1401 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the second transmitter 1401 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1401 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1401 comprises at least the first three of the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1401 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1401 transmits in at least one of a first time-frequency resource pool or a second time-frequency resource pool; herein, a first instant of time is a boundary instant of the first time-frequency resource pool in time domain, the first instant of time being used to indicate a first time window; when time-domain resources occupied by the second time-frequency resource pool and the first time window are overlapping, the first time-frequency resource pool and the second time-frequency resource pool are associated; when time-domain resources occupied by the second time-frequency resource pool and the first time window are orthogonal, the first time-frequency resource pool and the second time-frequency resource pool are not associated.

In one embodiment, a meaning of the first time-frequency resource pool and the second time-frequency resource pool being associated comprises: a PDCCH candidate comprised in the first time-frequency resource pool and a PDCCH candidate comprised in the second time-frequency resource pool are associated.

In one embodiment, a meaning of the first time-frequency resource pool the second time-frequency resource pool being associated comprises: the first time-frequency resource pool and the second time-frequency resource pool collectively comprise a first-type PDCCH candidate, the first-type PDCCH candidate being a PDCCH candidate reserved for one repetition of a possible information bit block in the first time-frequency resource pool and another repetition of the information bit block in the second time-frequency resource pool.

In one embodiment, the first time-frequency resource pool and the second time-frequency resource pool are respectively defined in different search space sets.

In one embodiment, the first time-frequency resource pool and the second time-frequency resource pool are respectively defined in different semi-persistent configurations.

In one embodiment, the first time window comprises K contiguous time unit(s), the K contiguous time unit(s) comprising the first instant of time, K being a positive integer.

In one embodiment, whether the first time-frequency resource pool is configured with a first configuration is used to indicate a number of time units comprised in the first time window.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure include but are not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, the UE comprising:

a processor configured to process data; and a receiver configured to:

receive, via radio resource control (RRC) signaling, a configuration that links a first search space set and a second search space set, the configuration indicating that a first physical downlink control channel (PDCCH) candidate with index p in the first search space set is associated with a second PDCCH candidate with index p in the second search space set for repetition of the same downlink control information (DCI);

monitor for the first PDCCH candidate in the first search space set and the second PDCCH candidate in the second search space set, wherein the second search space set overlaps in time at least in-part with the first search space set; and receive the same DCI in the first PDCCH candidate in the first search space set and in the second PDCCH candidate in the second search space set.

2. The UE of claim 1, wherein the first PDCCH candidate has a starting Control Channel Element (CCE) index, and the second PDCCH candidate has the same starting CCE index.

3. The UE of claim 1, wherein the first search space set is associated with a first Control Resource Set (CORESET) and the second search space set is associated with a second CORESET.

4. The UE of claim 1, wherein a first time-frequency resource pool is a first-type time-frequency resource pool, and a second time-frequency resource pool is a second-type time-frequency resource pool, the first-type time-frequency resource pool and the second-type time-frequency resource pool being defined in the first search space set and the second search space set, respectively; and in a time domain: among a plurality of second-type time-frequency resource pools, the second time-frequency resource pool has an end time nearest to a start time of the first time-frequency resource pool.

5. The UE of claim 3, wherein the first CORESET is received from a first transmission receive point (TRP) and the second CORESET is received from a second TRP.

6. The UE of claim 2, wherein the first PDCCH candidate has a same number of CCEs as the second PDCCH candidate.

7. A base station for wireless communications, the base station comprising:

a processor configured to process data; and one or more transmitters collectively configured to:

transmit, via radio resource control (RRC) signaling, a configuration that links a first search space set and a second search space set, the configuration indicating that a first physical downlink control channel (PDCCH) candidate with index p in the first search space set is associated with a second PDCCH candidate with index p in the second search space set for repetition of the same downlink control information (DCI); and transmit the same DCI in the first PDCCH candidate in the first search space set and in the second PDCCH candidate in the second search space set, wherein the second search space set overlaps in time at least in-part with the first search space set.

8. The base station of claim 7, wherein the first PDCCH candidate has a starting Control Channel Element (CCE) index, and the second PDCCH candidate has the same starting CCE index.

9. The base station of claim 7, wherein the first search space set is associated with a first Control Resource Set (CORESET) and the second search space set is associated with a second CORESET.

10. The base station of claim 7, wherein a first time-frequency resource pool is a first-type time-frequency resource pool, and a second time-frequency resource pool is a second-type time-frequency resource pool, the first-type time-frequency resource pool and the second-type time-frequency resource pool being defined in the first search space set and the second search space set, respectively; and in a time domain: among a plurality of second-type time-frequency resource pools, the second time-frequency resource pool has an end time nearest to a start time of the first time-frequency resource pool.

11. The base station of claim 8, wherein the first PDCCH candidate has a same number of CCEs as the second PDCCH candidate.

12. The base station of claim 9, wherein the first CORESET is transmitted from a first transmission receive point (TRP) and the second CORESET is transmitted from a second TRP.

13. A method performed by a user equipment (UE), the method comprising:

receiving, via radio resource control (RRC) signaling, a configuration that links a first search space set and a second search space set, the configuration indicating that a first physical downlink control channel (PDCCH) candidate with index p in the first search space set is associated with a second PDCCH candidate with index p in the second search space set for repetition of the same downlink control information (DCI);

monitoring for the first PDCCH candidate in the first search space set and the second PDCCH candidate in the second search space set, wherein the second search space set overlaps in time at least in-part with the first search space set; and receiving the same DCI in the first PDCCH candidate in the first search space set and in the second PDCCH candidate in the second search space set.

14. The method of claim 13, wherein the first PDCCH candidate has a starting Control Channel Element (CCE) index, and the second PDCCH candidate has the same starting CCE index.

15. The method of claim 13, wherein the first search space set is associated with a first Control Resource Set (CORESET) and the second search space set is associated with a second CORESET.

16. The method of claim 13, wherein a first time-frequency resource pool is a first-type time-frequency resource pool, and a second time-frequency resource pool is a second-type time-frequency resource pool, the first-type time-frequency resource pool and the second-type time-frequency resource pool being defined in the first search space set and the second search space set, respectively; and in a time domain: among a plurality of second-type time-frequency resource pools, the second time-frequency resource pool has an end time nearest to a start time of the first time-frequency resource pool.

17. The method of claim 15, wherein the first CORESET is received from a first transmission receive point (TRP) and the second CORESET is received from a second TRP.

18. The method of claim 14, wherein the first PDCCH candidate has a same number of CCEs as the second PDCCH candidate.

* * * * *